(12) United States Patent  
Sano (10) Patent No.: US 8,113,422 B2  
(45) Date of Patent: Feb. 14, 2012

(54) ARTICLE DATA PROCESSING APPARATUS

(75) Inventor: Kouichi Sano, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 551 days.

(21) Appl. No.: 12/275,330

(22) Filed: Nov. 21, 2008

(65) Prior Publication Data

US 2009/0134220 A1   May 28, 2009

(30) Foreign Application Priority Data

Nov. 22, 2007   (JP) ................................. 2007-302518

(51) Int. Cl.  
*G06K 15/00* (2006.01)
(52) U.S. Cl. .......................................... 235/383; 235/492
(58) Field of Classification Search .................. 235/383, 235/451, 492  
See application file for complete search history.

(56) References Cited

U.S. PATENT DOCUMENTS

| 6,712,268 B1 * | 3/2004 | Mason et al. ................ 235/383 |
| 7,450,013 B2 * | 11/2008 | Clancy et al. ............. 340/572.9 |
| 7,748,638 B2 * | 7/2010 | Hino et al. .................... 235/492 |

FOREIGN PATENT DOCUMENTS

| CN | 1816945 | 8/2006 |
| JP | 10-049756 | 2/1998 |

OTHER PUBLICATIONS

Chinese Office Action for 200810177073.2 mailed on Mar. 29, 2010.

* cited by examiner

*Primary Examiner* — Ahshik Kim  
(74) *Attorney, Agent, or Firm* — Turocy & Watson, LLP (57) ABSTRACT

An article data processing apparatus is provided with a first read instructing section which instructs a wireless system reading apparatus for reading identification information items stored in RFID tags attached to articles for sale to read the identification information items, a first receiving section which receives the identification information items from the wireless system reading apparatus corresponding to the first read instructing section, and a first storing section which stores the identification information items received by the first receiving section in a predetermined storage region, where, even in an arrangement that RFID tags of a plurality of articles for sale are hidden behind other articles for sale, the RFID tags can be read.

19 Claims, 8 Drawing Sheets

ARTICLE DATA PROCESSING APPARATUS

CROSS-REFERENCE TO RELATED APPLICATIONS

This application is based upon and claims the benefit of priority from prior Japanese Patent Application No. 2007-302518, filed Nov. 22, 2007, the entire contents of which are incorporated herein by reference.

BACKGROUND OF THE INVENTION

1. Field of the Invention

The present invention relates to an article data processing apparatus which is used for a POS (point of sale) system or the like and processes article data using RFID (Radio Frequency Identification).

2. Description of the Related Art

There are articles for sale, which are articles to be sold, and which are each attached with an RFID tag. Jpn. Pat. Appln. KOKAI Publication No. 10-49756 discloses a technique where RFID reading apparatuses are disposed on both sides of a basket receiving a plurality of articles for sale having RFID tags and the RFID reading apparatuses are connected to an article for sale data processing apparatus in a wired manner. Since information items of articles for sale in a basket are collectively read utilizing RFIDs in this technique, high-speed reading can be performed as compared with a case that barcodes of respective articles for sale are read one by one. Different identification information items are stored in RFID tags of respective articles for sale and even if pluralities of articles for sale are received in a basket, they can each be identified.

However, when a plurality of articles for sale are received in a basket, such an arrangement may occur that an RFID tag of an article for sale may be hidden behind another article for sale, and thus not be read by an antenna. In this case, there is such a problem that the RFID tag cannot be read.

BRIEF SUMMARY OF THE INVENTION

An object of the present invention is to be able to obtain such a configuration that, even if a plurality of articles for sale are received in a basket and an article for sale is placed such that its RFID tag is hidden behind another article for sale, the RFID tag can be read.

An article data processing apparatus of the present invention comprises: a first read instructing section which instructs a plurality of first reading apparatuses reading an identification information item in a wireless system to read identification information items stored in RFID tags attached to articles for sale; a first receiving section which receives the identification information items read by the plurality of first reading apparatuses in response to an instruction of the first read instructing section; a first storing section which stores the identification information items received by the first receiving section in a predetermined storage region; and a first duplication data checking section which makes determination about presence or absence of identical identification information items regarding the identification information items stored in the first storing section and when determining that there are identical identification information items, leaves one of the identical identification information items to erase the other identical identification information items.

Incidentally, in the claims and specification of the present invention, the term "wired system" means that a communication antenna of the reading apparatus and the read instructing section are connected to each other via a wired system.

According to the present invention, when a plurality of articles for sale are received in a basket, even if an article for sale is placed such that its RFID tag is hidden behind another article for sale, the RFID can be read.

DETAILED DESCRIPTION OF THE INVENTION

Figure 1:
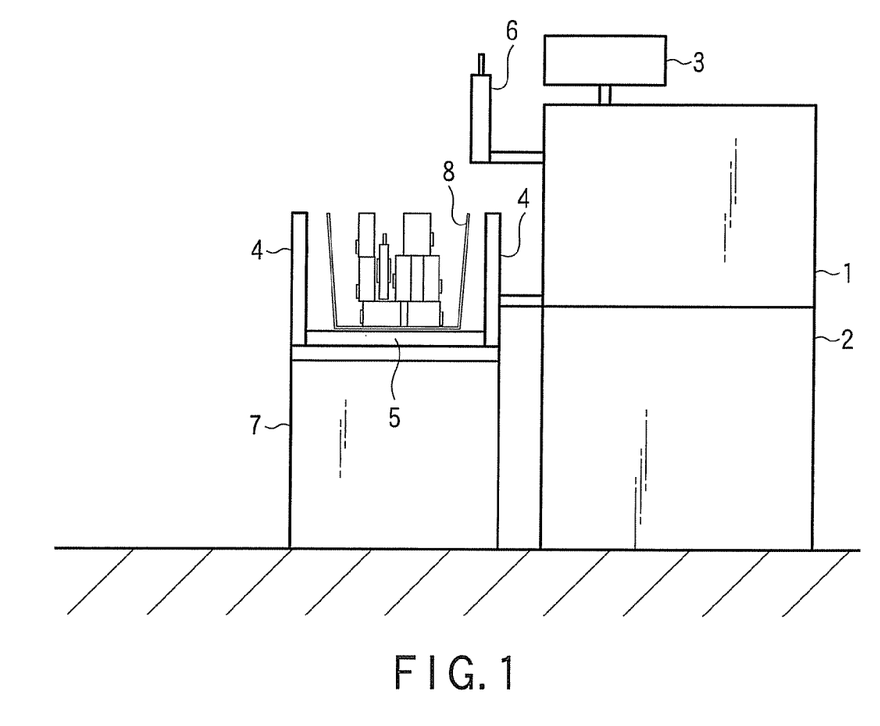
FIG. 1 is an overall view of a system including an article for sale data processing apparatus according to an embodiment of the present invention.

An embodiment of the present invention will be explained with reference to FIG. 1 to FIG. 9. FIG. 1 is a diagram of the entire system including an article for sale data processing apparatus of the present invention. An article for sale data processing apparatus 1 is placed on a register stand 2. The article for sale data processing apparatus 1 is provided with a display apparatus 3 which displays information items regarding article for sale data, a keyboard (not shown in FIG. 1) which performs a check-out processing operation and the like, a drawer which allows placing/removing of money, a printer which is used for receipt printing, journal printing, and the like. The article for sale data processing apparatus 1 may be a POS terminal. The article for sale data processing apparatus 1 is provided with antennas 4 of a wired system reading apparatus for reading an RFID tag by wiring connection and a weighing machine 5 which measures a weight. Though further described in detail later, the article for sale data processing apparatus 1 is provided with a communication apparatus 6 which performs communication with the wireless system reading apparatuses wirelessly. The antennas 4 of the wired system reading apparatus and the weighing machine 5 for measuring a weight are placed on a sucker stand 7 different from the register stand 2. The antennas 4 of the wired system reading apparatus are provided on both sides of the sucker stand so as to face each other. The weighing machine 5 is provided between two wired system reading apparatus antennas 4 below them. An upper portion of the weighing machine 5 is configured such that a basket 8 in which a plurality of articles for sale with an RFID tag are received can be put thereon.

Figure 2:
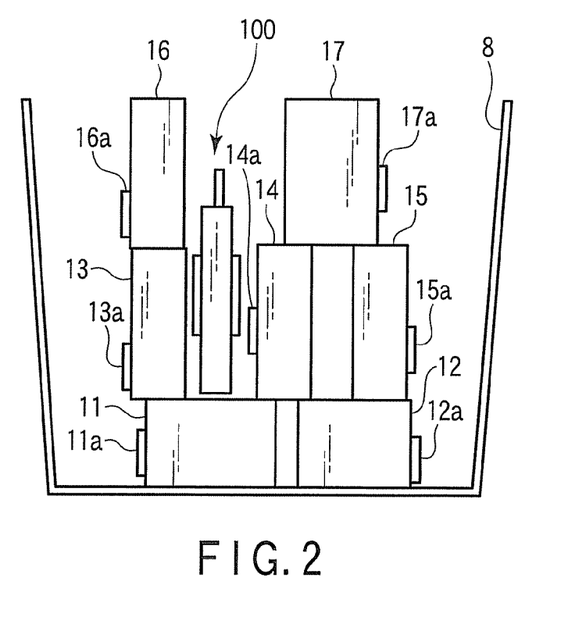
FIG. 2 is a view showing an aspect of the interior of a basket in which articles for sale with an RFID tag are received in an enlarged manner.

FIG. 2 is a view showing an aspect of inside the basket 8 shown in FIG. 1 in an enlarged manner. Seven articles for sale 11 to 17 and a wireless system reading apparatus 100 are received in the basket 8. Seven articles for sale are attached with RFID tags 11a to 17a stored with identification information, respectively. The article for sale 11 and the article for sale 12 are put at the bottom of the basket 7, and the article for sale 13 is put on the article for sale 11 and the article for sale 15 is put on the article for sale 12. The article for sale 14 is put to connect the article for sale 11 and the article for sale 12 and it is put between the article for sale 13 and the article for sale 15. The article for sale 16 is put on the article for sale 13, and the article for sale 17 is put so as to connect the article for sale 14 and the article for sale 15. In such an arrangement, an RFID tag 14a attached to the article for sale 14 is blocked from the antenna 4 of the wired system reading apparatus 4 by the article for sale 13 or the article for sale 15.

The wireless system reading apparatus 100 is disposed between the article for sale 13 and the article for sale 14. In FIG. 2, such a state that only one wireless system reading apparatus 100 is put in the basket 8 is shown, but the number of wireless system reading apparatuses 100 is not limited to one, and a plurality of, such as three, wireless system reading apparatuses 100 may be put in the basket 8. A size of base substance 110 which is a main body of the wireless system reading apparatus 100 is set such that a height thereof is smaller than a height of the basket 8 and a thickness thereof is smaller than a width of the basket 8.

Figure 3A:
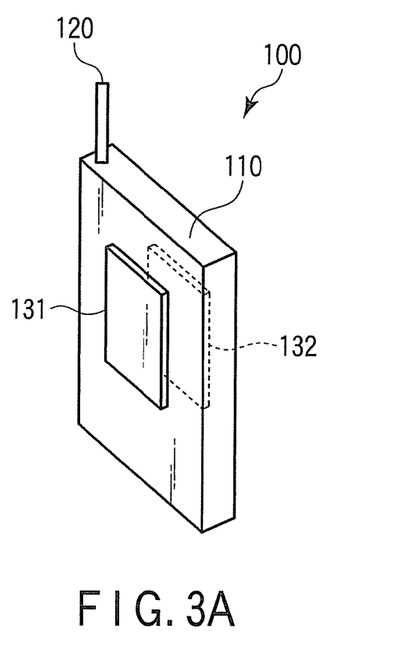
FIG. 3A is a perspective view of a wireless system reading apparatus according to an embodiment of the present invention.

FIG. 3A is a view showing the wireless system reading apparatus 100 shown in FIG. 2 in an enlarged manner. The wireless system reading apparatus has such a configuration that the communication apparatus 6 and a communication antenna 120 for performing wireless communication, and a plurality of reading antennas 131 and 132 for reading out an identification information item of an article for sale stored in the RFID tag 14a attached to the article for sale or the like are provided on a thin rectangular plate-shaped base substance 110. The reading antenna 131 is provided on one side surface of the base substance and the reading antenna 132 is provided on a surface of the base substance opposite to the surface on which the reading antenna 131 is provided. The communication antenna 120 is provided on a surface of the base substance perpendicular to the surfaces on which the reading antennas 131 and 132 are provided (an upper surface of the base substance). Each reading antenna may be a patch antenna or a loop antenna.

Since the base substance is formed in a plate shape, it can be inserted in a narrow space which is formed by inserting a plurality of articles for sale in the basket 8.

Figure 3B:
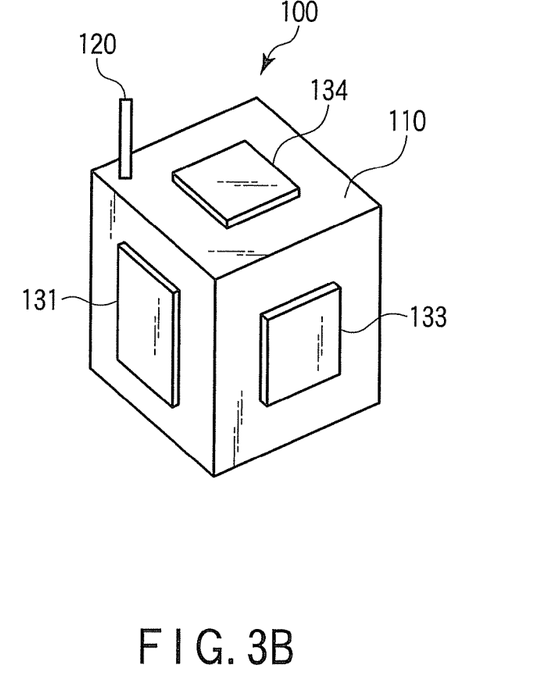
FIG. 3B is a perspective view of a wireless system reading apparatus according to another embodiment of the present invention.

The wireless system reading apparatus 100 is not limited to a shape shown in FIG. 3A. As shown in FIG. 3B, the base substance may be formed in a regular hexahedron. In this case, it is desirable that reading antennas are provided on both opposite surfaces of the base substance. For example, reading antennas 131, 133, and 134 may be provided on all surfaces of the base substance. When a surface of the base substance on which the communication antenna is provided is defined as an upper surface, such a configuration can be adopted that reading antennas are provided on all side surfaces of the base substance and no reading antenna is provided on the upper surface and the opposite side thereof. The shape of the base substance is not limited to a rectangular parallelepiped and it may be any polyhedron. In the case of a base substance shaped as a polyhedron, it is preferable that reading antennas are provided on both surfaces of the base substance opposite to each other.

Figure 4:
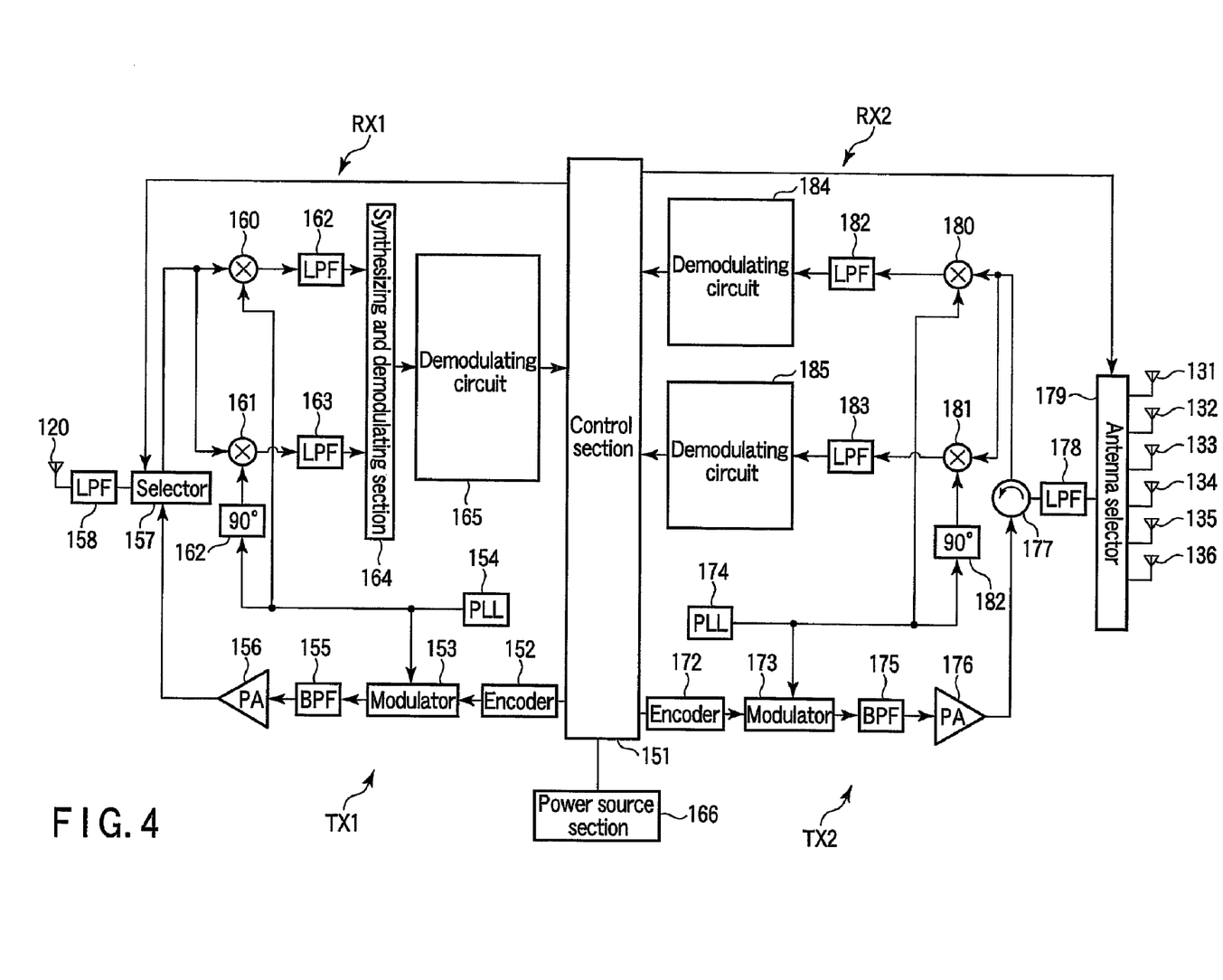
FIG. 4 is a circuit diagram of inside of the wireless system reading apparatus according to an embodiment of the present invention.

Next, a circuit diagram of the interior of the wireless system reading apparatus 100 will be explained with reference to FIG. 4. The wireless system reading apparatus 100 comprises a control section 150 including a CPU, a ROM storing a control program therein, a RAM temporarily storing data therein, and the like, a circuit block of the communication antenna 120, a circuit block of the reading antenna 131 and the like, a power source section 166, and the like. The control section 151 has a communication protocol function of an RFID tag compliant with ISO18000-6.

First, the block regarding the communication antenna 120 will be explained. The block regarding the communication antenna 120 is provided with a receiving section RX1 processing a radio wave (electromagnetic wave) transmitted from the communication apparatus 6 as a receiving signal and a transmitting section TX1 producing a radio wave for transmitting an information item received from an RFID tag to the communication apparatus 6. In the block regarding the communication antenna 120, the transmitting section TX1 and the receiving section RX1 are connected to a selector 157, and the selector 157 is connected with the communication antenna 120 via a low-pass filter (LPF) 158. The block regarding the communication antenna 120 is provided with a phase looked loop (PLL) section 154 producing a first local carrier signal with a carrier wave frequency and a phase shifter 162 shifting a phase of the first local carrier signal produced by the PLL section 154 by 90° to produce a second local carrier signal. The PLL section 154 is connected to the phase shifter 162. The selector 157 is also connected to the control section 151. The selector 157 is set to the side of the receiving section RX1 at an ordinary standby state and at a signal receiving time from the communication apparatus 6, while the selector 157 is set to the side of the transmitting section TX1 only at a time of data transmission.

An encoder 152, an amplitude modulator 153, a band-pass filter (BPF) 155, and a power amplifier (PA) 156 are connected to the transmitting section TX1 in series. The power amplifier 156 connects to the selector 157. The power amplifier 156 encodes transmission data output from the control section 151 using, for example, a Manchester code or FM0 code to output the same. The amplitude modulator 153 performs mixing of a data signal from the encoder 152 and a first local carrier signal from the PLL section 154 to output a radio wave of a high-frequency signal obtained by amplitude-modulating the data signal with a carrier wave which is the first local carrier signal. The radio wave is band-restricted by the BPF 155 and power-amplified by the power amplifier 156 to be supplied to the selector 157. The selector 157 guides the radio wave to the communication antenna 120 via the LPF 158. Thereby, the radio wave is emitted from the communication antenna 120 toward the communication apparatus 6.

The receiving section RX1 has a function of performing orthogonal detection on a reception signal obtained from reception of a radio wave from the communication apparatus 6. The receiving section RX1 comprises two mixers 160, 161, two low-pass filters (LPFs) 162, 163, a synthesizing and demodulating section 164, a demodulating circuit 165, and the like. The selector 157 and the mixers 160 and 161 are connected in parallel, and the mixer 160, the LPF 162, the synthesizing and demodulating section 164, and the demodulating circuit 165 are connected in series. The mixer 161, the LFP 163, and the synthesizing and demodulating section 164 are also connected in series. The phase shifter 162 is connected to the mixer 161.

A reception signal received from the communication apparatus 6 is supplied from the antenna 120 to the selector 157 via the LPF 158 and it is guided to the receiving section RX1 by instruction from the control section 151. The mixer 160 performs mixing of a reception signal received from the selector 157 and a first local carrier signal to produce an in-phase signal (I signal). The LPF 162 receives a signal output from the mixer 160 to remove noise component from the I signal. The synthesizing and demodulating section 164 receives the I signal from the LPF 162. The mixer 161 performs mixing of the reception signal received from the selector 157 and the second local signal shifted to the first local carrier signal by 90° to produce an orthogonal signal (Q signal). The LPF 163 receives a signal output from the mixer 161 to remove a noise component from the Q signal. The synthesizing and demodulating section 164 receives the Q signal from the LPF 163. The synthesizing and demodulating section 164 synthesizes the I signal and the Q signal. The demodulating circuit 165 includes a binarizing function, a clock generating function, a preamble function decoding function, and an error detecting function. The demodulating circuit 165 outputs a demodulation result to the control section 151.

Next, the circuit block regarding the reading antenna 131 and the like will be explained. The block regarding the reading antenna 131 is provided with a transmitting section TX2 which generates a radio wave for transmission to the RFID and a receiving section RX2 which processes a radio wave transmitted from an RFID tag as a reception signal.

In the block regarding the reading antenna, the transmitting section TX2 and the receiving section RX2 are connected to a directional coupler 177 such as a circulator, and the directional coupler 177 is connected with a communication antenna selector 179 via a low-pass filter (LPF) 178. The communication antenna selector 179 is connected with reading antennas 131 to 136. The block regarding the reading antenna 120 is provided with a phase looked loop (PLL) section 174 which produces a first local carrier with a carrier wave frequency and a phase shifter 182 which shifts a phase of a third local carrier signal produced by the PLL section 174 by 90° to produce a fourth local carrier signal. The PLL section 174 is connected to the phase shifter 182. The antenna selector 179 is also connected to the control section 171.

An encoder 172, an amplitude modulator 173, a band-pass filter (BPF) 175, and a power amplifier (PA) 176 are connected to the transmitting section 172 in series. The power amplifier 176 is connected to the directional coupler 177. The encoder 172 encodes transmission data output from the control section 171 using, for example, a Manchester code or FM0 code to output the same. The amplitude modulator 173 performs mixing of data signal from the encoder 172 and the third local carrier signal from the PLL section 174 to output a radio wave of high-frequency signal obtained by amplitude-modulating the data signal with a carrier wave which is the third local carrier signal. The radio wave is band-restricted by the BPF 175 and power-amplified by the power amplifier 176 to be supplied to the directional coupler 177. The directional coupler 177 guides the radio wave to the communication antenna 120 via the LPF 178. Thereby, the radio wave is radiated from the reading antenna 131 or the like toward the RFID tag.

The receiving section RX2 has a function of performing orthogonal detection on a reception signal obtained by reception of the radio wave from the communication apparatus 6. The receiving section RX2 comprises two mixers 180, 181, two low-pass filters (LPFs) 182, 183, two demodulating circuits 184, 185, and the like. The directional coupler 177 and the mixers 180 and 181 are connected in parallel, the mixer 180, the LPF 182, and the demodulating circuit 184, are connected in series, and the mixer 181, the LPF 183, and the demodulating circuit 185 are connected in series. The phase shifter 182 is connected to the mixer 181. A reception signal received from a RFID tag is supplied from the reading antenna 131 or the like to the directional coupler 177 via the LPF 178 to be guided to the receiving section RX2. The mixer 180 performs mixing of a reception signal received from the directional coupler 177 and the third local carrier signal to produce an in-phase signal (I signal). The LPF 182 receives a signal output from the mixer 180 to remove a frequency component (noise component) higher than a base band frequency corresponding to a bit rate of response information from the RFID tag from the I signal. The demodulating circuit 184 includes a binarizing function, a clock generating function, a preamble function decoding function, and an error detecting function. The demodulating circuit 184 is input with I signal component obtained by removal of noise component from the LPF 182 to output a demodulation result to the control section 151. The mixer 181 performs mixing of a reception signal received from the directional coupler 177 and a fourth local signal shifted to the third local carrier signal by 90° to produce an orthogonal signal (Q signal). The LPF 183 receives a signal output from the mixer 181 to remove a frequency component (noise component) higher than a base band frequency corresponding to a bit rate of response information from a RFID tag from the Q signal. The demodulating circuit 185 includes a binarizing function, a clock generating function, a preamble function decoding function, and an error detecting function. The demodulating circuit 185 is input with a Q signal component obtained by removal of a noise component from the LPF 183 to output a demodulation result to the control section 151.

Incidentally, though not illustrated, a plurality of channels are provided and a plurality of reading apparatuses use a radio wave simultaneously within a band where a radio wave can be output. Though not illustrated, a channel detection section which detects whether or not the channel is being used in another apparatus is provided.

Next, a function of a case where an RFID tag is a passive tag having no battery will be explained. In the wireless system reading apparatus 100, a non-modulated carrier is first amplified by the power amplifier 176 and an electromagnetic wave is output from the reading antenna 131 or the like via the directional coupler 177 so that the RFID is activated. Next, when data is transmitted to an RFID tag, amplitude modulation is performed at the amplitude modulator 173 using an encoded signal. When a signal is received from an RFID tag, an electromagnetic wave signal received from the RFID tag is orthogonally demodulated at the receiving section RX2 via the directional coupler 177, a synchronous clock is produced, a predetermined preamble is detected, searching for data is detected, and decoding is performed so that reception data can be obtained.

In the embodiment, control is made such that, unless an error is detected in one of demodulation at an in-phase component of orthogonal demodulation and demodulation at an orthogonal component, correct data has been received. The term electromagnetic wave refers to synthesis of a radio wave and a magnetic field orthogonal to the radio wave.

Figure 5:
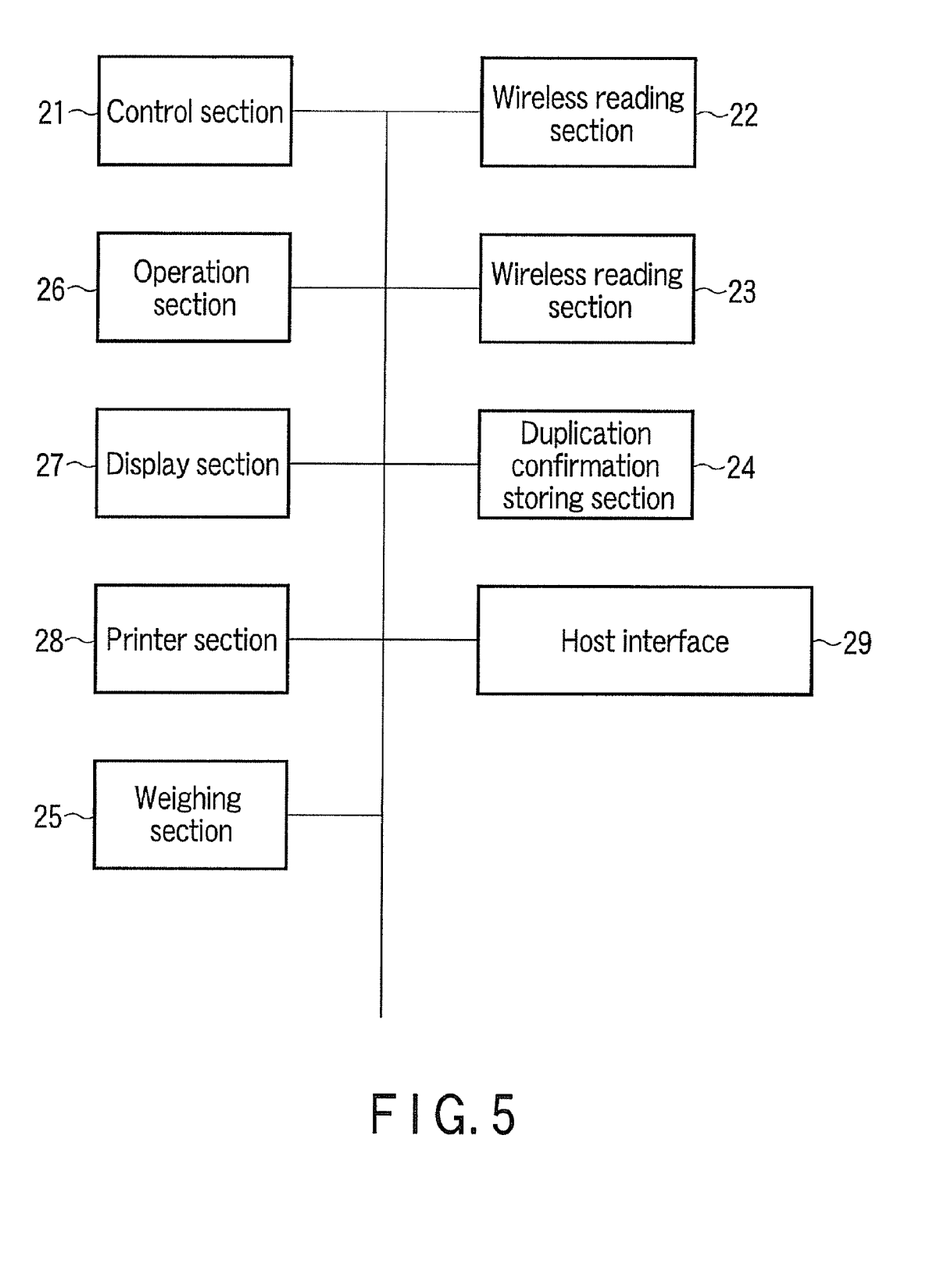
FIG. 5 is an electric block diagram of the article for sale data processing apparatus according to the embodiment of the present invention.

Next, an electric block diagram of the article for sale data processing apparatus of the present invention will be explained with reference to FIG. 5. A control section 21 including a CPU, a ROM storing a program having a predetermined function and the like, and a RAM temporarily storing data, and the like, a wireless reading section 22 including the communication apparatus 6 for performing wireless communication with the wireless system reading apparatus 100, a wired reading section 23 including a wired system reading apparatus connected to the antenna 4, and a duplication confirmation storing section 24 are connected to one another. A weighing section 25 including a weighing machine 5 for measuring a weight, an operation section 26 including a keyboard, a display section 27 including an indicator 3, a printer section 28 including a receipt printer and a journal printer, and a host interface 29 performing transmission and reception of data with an external host computer are connected to the control section 21.

Figure 6:
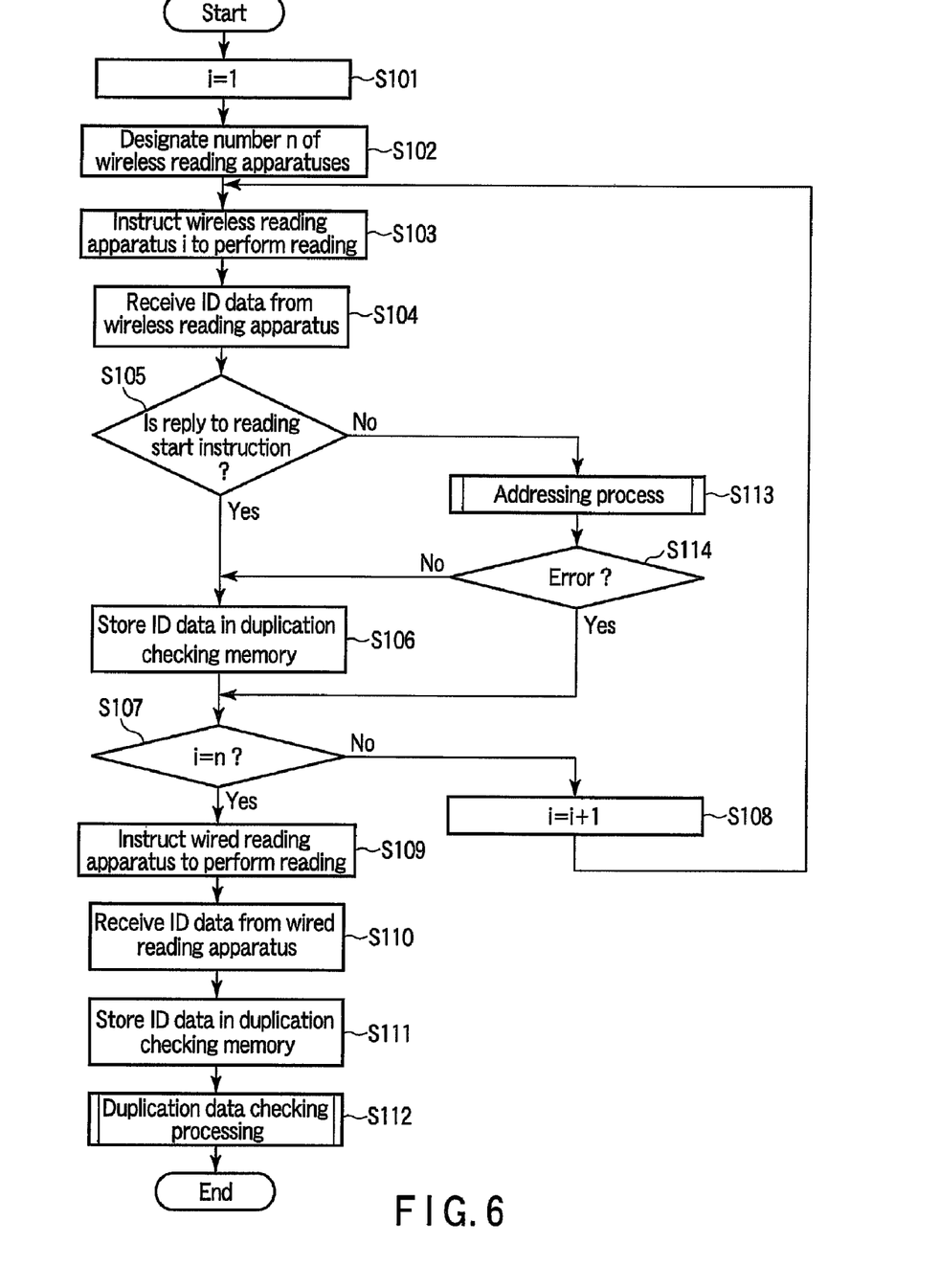
FIG. 6 is a main flowchart for explaining the embodiment of the present invention.
Figure 7:
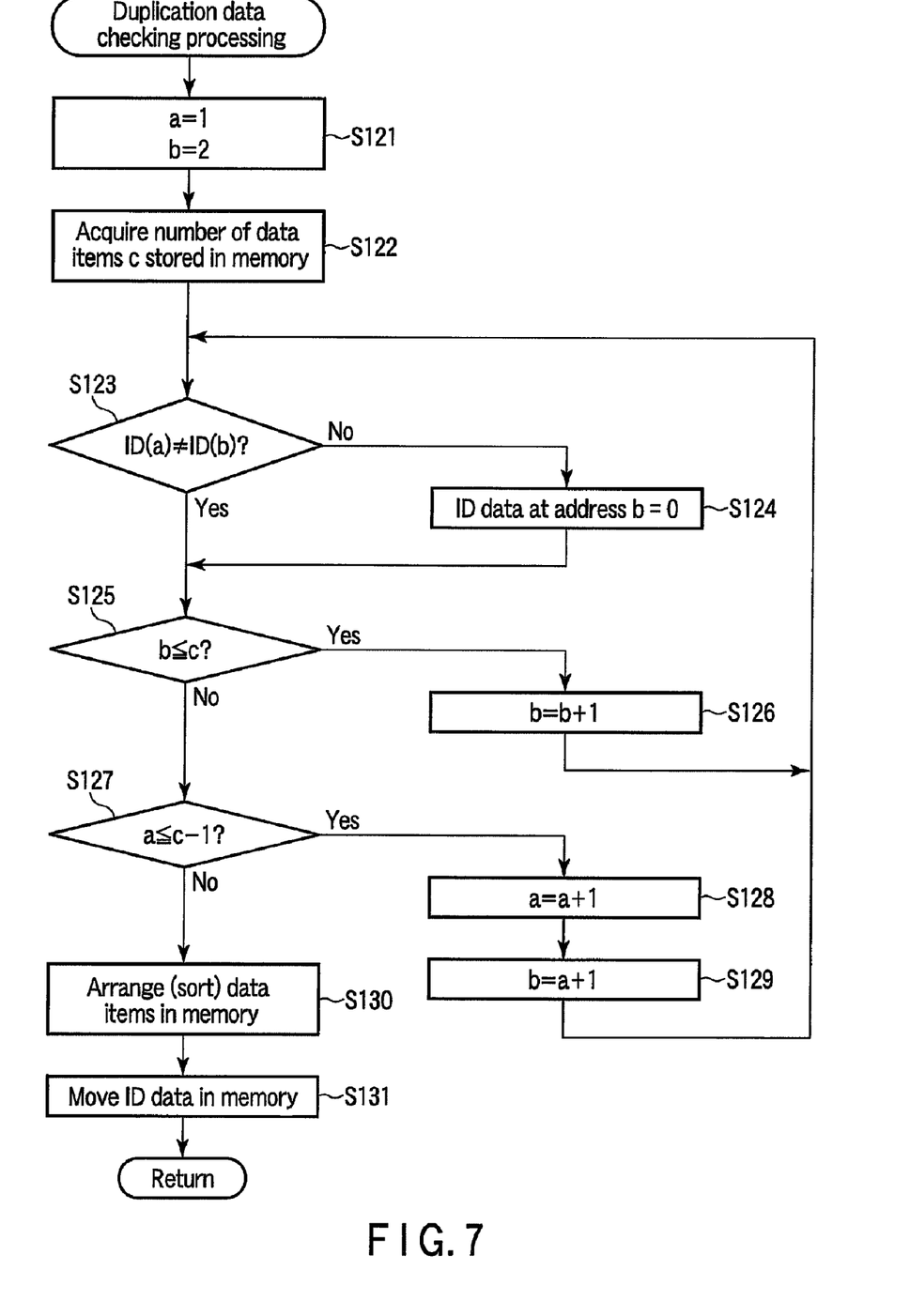
FIG. 7 is a sub-flowchart for explaining the embodiment of the present invention.
Figure 8:
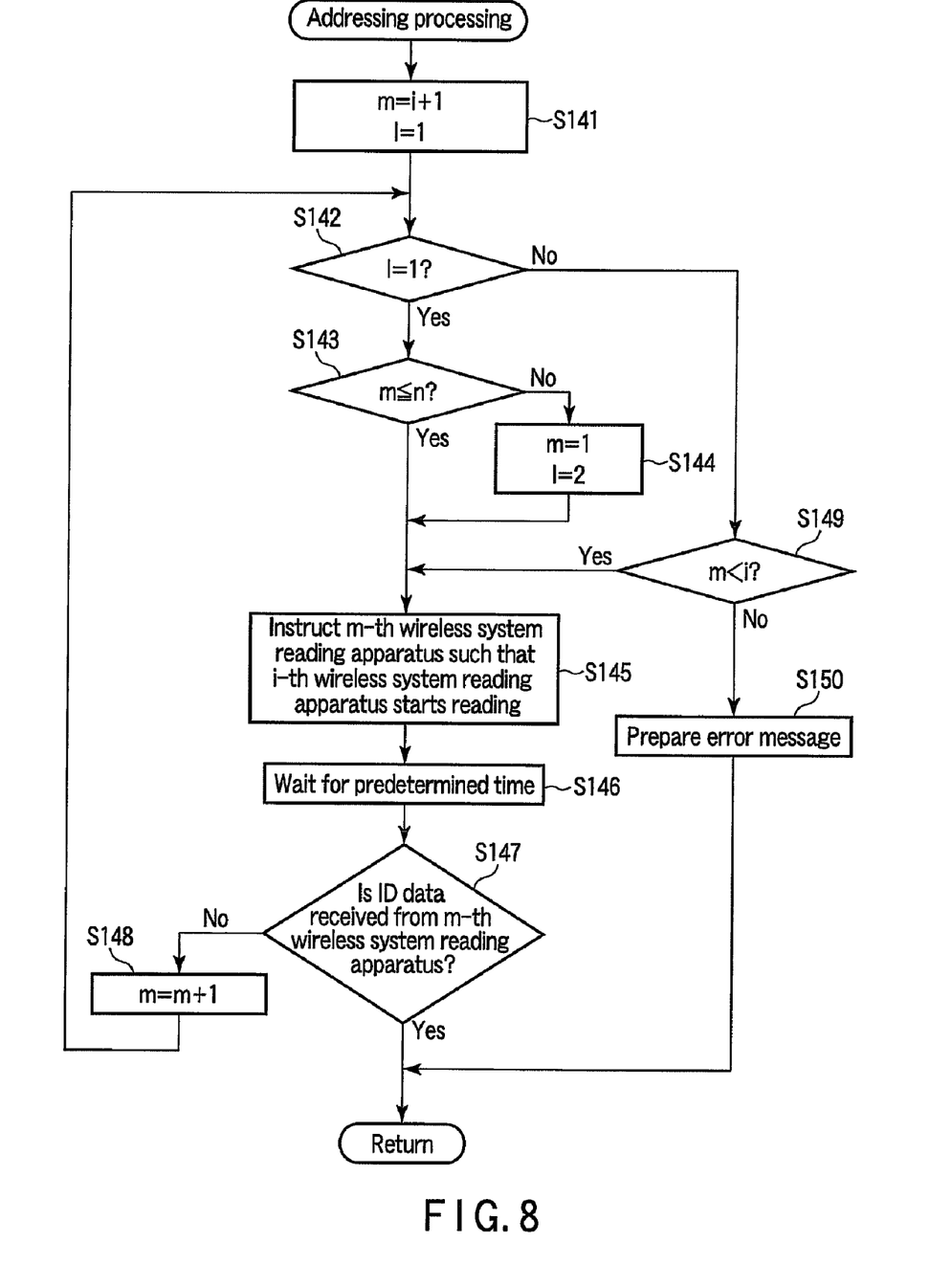
FIG. 8 is a sub-flowchart for explaining the embodiment of the present invention.

Next, an article for sale data processing for reading identification information items stored in RFID tags will be explained with reference to FIGS. 6 to 8. FIG. 6 is a main flowchart. FIG. 7 is a sub-flowchart of a duplication data checking processing explained in FIG. 6, and FIG. 8 is a flowchart of an addressing processing (relay processing) explained in FIG. 6.

First, an operator inserts a plurality of wireless system reading apparatuses 100 in a basket receiving articles for sale therein. The operator puts the basket 8 on the weighing machine 5, where, when a predetermined weight is recognized by the control section, the flowchart shown in FIG. 6 starts. When the control section 21 recognizes that the basket 8 has been put on the weighing machine 5, the processing of the flowchart starts, where i=1 is defined so that initialization is performed (step 101, which is hereinafter abbreviated to "S101"). The symbol "i" means the order of target wireless system reading apparatuses 100. Since the operator indicates the number of wireless system reading apparatuses 100 through the keyboard, the control section 21 stores the number in a predetermined region of the RAM as n (S102). That is, "n" indicates the number of wireless system reading apparatuses 100 received in the basket 8. S102 is a wireless system reading apparatus number designating section.

Next, the control section 21 instructs the i-th wireless system reading apparatus to read identification information items stored in RFID tags attached to articles for sale in the basket 8 (S103). The instruction is emitted from the communication apparatus 6 in a wireless manner to reach the wireless system reading apparatuses 100. First of all, a reading instruction is issued to the first wireless system reading apparatus. S103 is a first read instructing section. Since identification information items regarding RFID tags read from the i-th wireless system reading apparatus is transmitted in response to the first instructing section after a predetermined time lapsed from the instruction of S103, the control section 21 receives the identification information items via the communication apparatus 6 (S104). S104 is a first receiving section.

At this time, the wireless system reading apparatus 100 performs a reading processing using all the reading antennas to transmit identification information items read by all the reading antennas from the communication antenna 120. Accordingly, such a case occurs that the identification information includes a plurality of items. At this time, since information about the reading antenna which has been used for reading is not necessary, such information is not added. At this time, such a case occurs that there is no reply due to the i-th wireless system reading apparatus being hidden behind an article for sale. The control section 21 determines whether or not received identification information items (ID data) include an information item from the i-th wireless system reading apparatus (S105). That is, the control section 21 determines whether or not a reply has been sent correctly in response to a reading start instruction. When the determination is affirmative (Y at S105), the control section 21 stores identification information items according to the number of identification information items received from a predetermined address, which is a predetermined region of the duplication confirmation storing section 24. The control section 21 changes a position of the predetermined address in preparation for the next reception. When the control section 21 terminates the storing processing of the duplication confirmation storing section 24, it determines whether or not the current "i" is equal to "n". That is, the control section 21 determines whether or not the wireless system reading apparatus to which a reading instruction has been issued is the final one. When the determination is negative (N at S107), the control section 21 increments the value of "i" by "1" (S108). The control section 21 returns to the processing at S103, and it performs processing from S103 to S107. Since the value of "i" is incremented by "1" at S108, the instruction at S103 is issued such that the wireless system reading apparatuses perform reading in turn.

When the value of "i" is equal to the value of "n" at S107 (N at S107), reading instructions to all the wireless system reading apparatuses in the basket 8 have been completed, so that the control section 21 leaves the processing from S103 to S108. In the case of N at S107, the control section 21 instructs the wired system reading apparatus included in the wired reading section to read identification information items stored in RFID tags attached to articles for sale received in the basket 8 (S109). S109 is a second read instructing section. Since identification information items regarding the read RFID tags read are transmitted from the antennas 4 of the wired system reading apparatus in response to the second instructing section after a predetermined time elapsed from the instruction from S109, the control section 21 receives the identification information items (S110). The wired system reading apparatus has two antennas 4, and identification information items read by individual antennas 4 are received by the wired reading section in turn, but omission is made on the flowchart such that the identification information items can be collectively received. S110 is a second receiving section. The control section 21 stores identification information items according to the number of identification information items received from the predetermined address of the duplication confirmation storing section 24 (S111). S111 is a second storing section.

In this state, all the identification information items read by all the wireless system reading apparatuses and the wired system reading apparatuses have been stored in the duplication confirmation storing section 24. Accordingly, the control section 21 performs a duplication data checking processing (S112). S112 is a duplication data checking section. A detailed explanation of S112 is made with reference to FIG. 7. The reason why the duplicated data checking processing must be performed will be explained here. There is no possibility that an identification information item is read from an antenna of each of the wireless system reading apparatus and the wired system reading apparatus in a duplicated manner. However, since each reading apparatus cannot recognize identification information items read by the other reading apparatuses, one identification information item read by one reading apparatus may be read by different wireless reading apparatus in a duplicated manner. Therefore, it is necessary to examine whether or not one identification information item has been read in a duplicated manner.

The case of N at S105 will be explained. There is a possibility that a reading instruction from the communication apparatus 6 does not reach the i-th wireless reading apparatus due to the designated i-th wireless reading apparatus being hidden behind an article for sale. In such a case, since the reading instruction does not reach the i-th wireless reading apparatus, the i-th wireless reading apparatus does not read to the communication apparatus 6 an identification information item of a RFID and it does not send a reply to the communication apparatus 6. This case corresponds to the case of N at step S105. In the case of N at step S105, an addressing processing is performed (S113). The details of the addressing processing are shown in FIG. 8. After the processing at S113 is terminated, the control section 21 determines whether or not an error message has been prepared (S114). When the determination is negative at step S114 (N at step S114), which means that an identification information item has been received from a specific wireless system reading apparatus, the control section 21 proceeds to step S106. On the other hand, a case of Y at step S114 means that an identification information item cannot be received from the i-th wireless system reading apparatus. Accordingly, since there is no identification information item to be stored in the duplication confirmation storing section 24, the control section 21 proceeds to S107.

In the embodiment, the case that a plurality of wireless system reading apparatuses is received in the basket 8 has been explained, but the number of wireless system reading apparatuses may be one. The combination of the wireless system reading apparatus and the wired system reading apparatus has been explained here, but the present invention can be implemented using only the wireless system reading apparatuses. The present invention can be implemented using two or more antennas for the wired system reading apparatus. The example where the wireless system reading apparatuses are put in the basket together with articles for sale or a article for sale group and the wired system reading apparatus is installed outside the articles for sale or the article for sale group has been explained, but the reading apparatus installed outside the articles for sale or the article for sale group is not limited to a wired system reading apparatus, and it may be a wireless system reading apparatus.

Next, a detailed explanation about the duplication data checking processing at S112 will be explained with reference to FIG. 7. The control section 21 defines a=1 and b=1 as initialization (S121). The parameters "a" and "b" indicate positions of addresses of the duplication confirmation storing section 24. 1 means a leading address. Next, the control section 21 acquires the number of identification information items stored in the duplication confirmation storing section 24 to define the number as "c" (S122). The control section 21 determines whether or not the identification information item at the address "a" and the identification information item at the address "b" are identical (S123). Since different identification data items are stored in the respective RFID tags, it is possible to discriminate identical articles for sale from one another even if they are received in a plurality of baskets 8. Therefore, such a fact that identical identification information items are stored in different addresses of the duplication confirmation storing section 24 means that an identical RFID tag has been read by different reading apparatuses. Accordingly, it is necessary to perform deletion such that only one of the different addresses remains. When it has been determined that the identification information item at the address "a" and the identification information item at the address "b" are identical, namely, in the case of N at S123, the control section 21 rewrites the identification information item at the address "b" (ID data) to 0 (S124). The control section 21 determines whether or not the value of "b" is equal to or less than the value of "c" (S125). That is, the control section 21 determines whether or not confirmation has been made about whether or not there is duplication between the identification information item at the address "a" of the duplication confirmation storing section 24 and all the identification information items stored in the duplication confirmation storing section 24. In the case of Y at S125, the control section 21 increases the address "b" by one (S126). The control section 21 returns to the processing at S123 to repeat the processing from S123 to S126.

In the case of N at S125, the control section 21 can determine that there is no duplication between the identification information item stored at the address "a" and all the identification information items stored in the duplication confirmation storing section 24, so that the control section 21 proceeds to a processing at S127. On the other hand, in the case of Y at S123, two identification information items are different from each other, so that the control section 21 proceeds to the processing at S125 as it is. The control section 21 determines whether or not the value of "a" is equal to or less than the value of (c−1) (S127). When the value of "a" is equal to or less than the value of (c−1) (Y at S127), it is necessary to check duplication of the identification information item stored at the address "a", so that the control section 21 increases the value of "a" by one (S128). The control section 21 redefines "b" to the value of (a+1) (S129). The control section 21 returns to the processing at S123. The processing at S129 is set in order to exclude the combination which has been already confirmed. Thereby, the total number of combinations of checks (confirmations) is reduced to half thereof.

The case of N at S127 means that checking all duplications in the duplication confirmation storing section 24 has been completed. At this time, since duplicated identification information items have been rewritten to 0 except for one thereof, there is no duplication of the identification information items. The control section 21 sorts and re-arranges identification data items in the duplication confirmation storing section 24 in a descending order (S130). At this time, data items which have been determined as duplication to be rewritten to 0 are collected at large addresses in the duplication confirmation storing section 24. The control section 21 stores identification information 0.

The control section 21 moves identification information items just before an address in which identification information item 0 has been stored to the RAM of the control section 21 as identification numbers of articles for sale received in the basket 8 (S131). When the control section 21 terminates the processing at S131, it leaves the sub-flowchart.

Next, a detailed explanation of the addressing processing at S113 will be made with reference to FIG. 8. The control section 21 defines m=i+1 and l=1 (S141). The parameter "m" indicates the radix of the wireless system reading apparatuses issuing an instruction to the i-th wireless system reading apparatus which could not respond to a reading instruction. The parameter "l" is a flag for determining whether the value of "m" is larger than or smaller than the value of "i". The control section 21 determines whether or not l=1 (S142). A case of l=1 means that "i" is smaller than the radix "m". In the case of Y at step S142, the control section 21 whether or not "m" is equal to or smaller than "n" (S143). The case that "m" is larger than "n" (N at S143) means that there is no corresponding wireless system reading apparatus, so that "m" is rewritten to "1". Since the radix becomes smaller than "i", "l" is rewritten to "2" (S144). The control section 21 instructs the m-th wireless system reading apparatus such that the i-th wireless system reading apparatus starts reading (S145). At this time, when a reading start instruction reaches the i-th wireless system reading apparatus, the control section 21 receives an identification information item read by the i-th wireless system reading apparatus and simultaneously issues an instruction of sending a reply to the article for sale data processing apparatus in response to the instruction. In the case of Y at S143, the control section 21 directly proceeds to a processing at S145. The control section 21 holds it for a predetermined time (S146). Since this instruction is not a direct instruction to the wireless system reading apparatus to be caused to perform reading to wait for a reply but it is a roundabout instruction, a waiting time longer than the waiting time of the processing at S104 is set. After waiting for a predetermined time, the control section 21 determines whether or not an identification information item read by the i-th wireless system reading apparatus has been received from the m-th wireless system reading apparatus (S147). When the determination is affirmative (Y at S147), the control section 21 leaves this sub-flowchart. In the case of N at S147, an identification information item read by the i-th wireless system reading apparatus cannot be acquired yet, so that the control section 21 performs a processing of m=m+1 (S148). The control section 21 returns back to the processing at S142 to repeat the processing from S142 to S147. That is, the control section 21 tries to receive the identification information item read by the i-th wireless system reading apparatus utilizing a different wireless system reading apparatus. S145 can be defined as a fourth read instructing section and S147 can be defined as a fourth receiving section.

In the case of N at S142, namely, when the control section 21 leaves the processing at S144, it proceeds to a processing at S149. The control section 21 determines whether or not the value of "m" is smaller than the value of "i" (S149). In the case of Y at S149, the control section 21 proceeds to the processing at S145. A case of N at S149 means that the value of "m" is equal to the value of "i". Since such a fact has been confirmed at S105 that there is no reception corresponding to an instruction to the i-th wireless system reading apparatus from the communication apparatus 6, even if a reading instruction is issued in a roundabout manner, an identification information item of an RFID tag cannot be received, so that the control section 21 prepares an error message to leave this sub-flowchart (S150).

There is such a case that, even if an instruction from the communication apparatus 6 does not reach a target wireless system reading apparatus due to the wireless system reading apparatus being hidden behind an article for sale, the instruction can be read by detouring the instruction. Thereby, the control section 21 can read more identification information items. In the embodiment, the apparatus where the radix "m" of the wireless system reading apparatuses issuing a detour instruction is larger than the radix "i" is first set as a target but the present invention is not limited to this example, and an apparatus having a radix smaller than radix "i" may be first set as a target.

Figure 9:
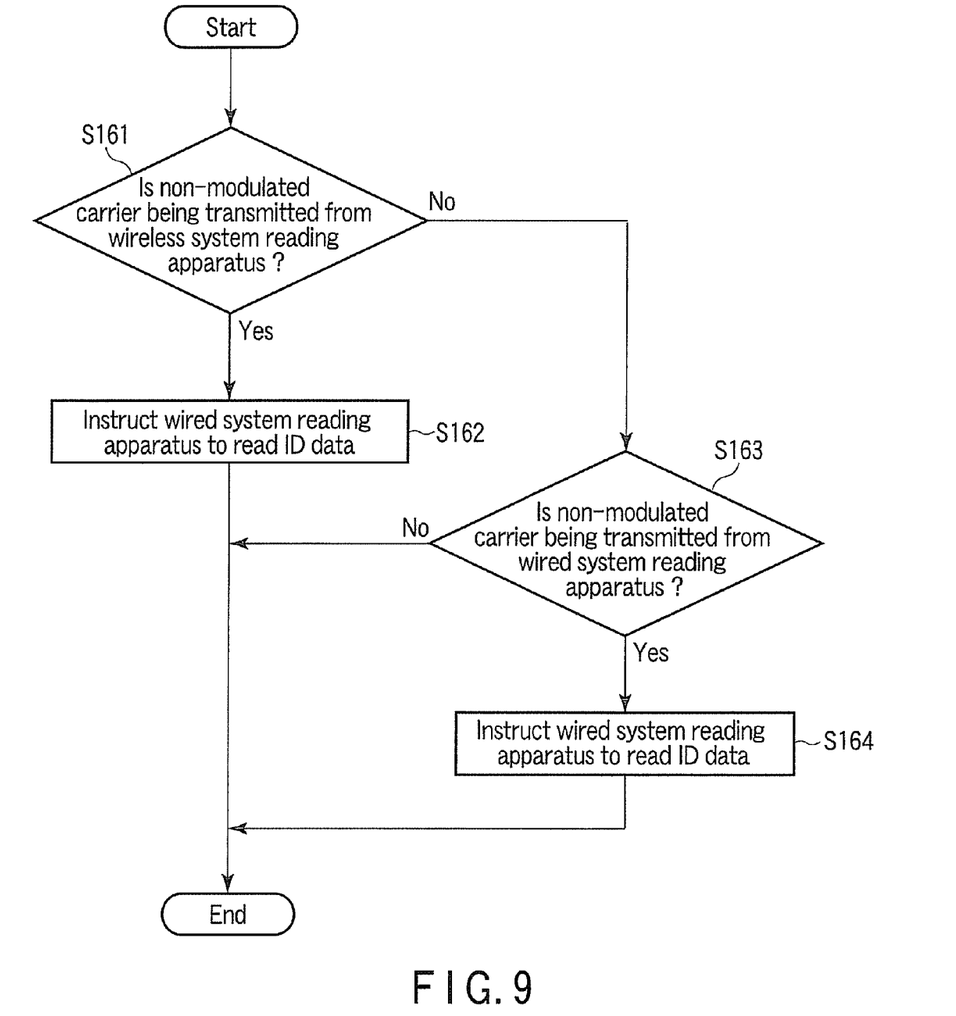
FIG. 9 is a flowchart for explaining the embodiment of the present invention.

Next, a processing of the control section 21 when a processing for increasing power supplied to RFID tags has been performed will be explained with reference to FIG. 9.

The control section 21 determines whether or not a non-modulated carrier is being transmitted from the wireless system reading apparatus (S161). That is, the control section 21 determines whether or not a reading instruction at S103 has been issued. When a RFID tag is a passive tag which does not have a battery, a non-modulated carrier is transmitted in order to supply power at a reading time. In the case of Y at S161, the control section 21 instructs the wired system reading apparatus to start reading of identification information items (S162). On the other hand, in the case of N at S161, the control section 21 determines whether or not a non-modulated carrier is being transmitted from the wired system reading apparatus (S163). That is, the control section 21 determines whether or not a reading instruction at S109 has been issued. In the case of Y at S163, the control section 21 instructs the wireless system reading apparatus to start reading of identification information items (S164). On the other hand, in the case of N at S163, since a processing for increasing power supplied to an RFID tag has not been performed, the control section 21 terminates the processing. S162 and S164 configure a third read instructing section. Incidentally, even if the RFID tag is one of a type housing a battery therein, this flowchart can be implemented.

According to such a processing, an RFID tag can be read in such an arrangement that, when a plurality of articles for sale are put in a basket, the RFID tag is hidden behind another article for sale.

The basket in the embodiment has been explained as one receiving articles for sale (articles). The shape of the basket may be any shape of a container which can receive articles. In the embodiment, the POS system has been explained and the article has been explained as the article for sale. However, the present invention may be applied to a system other than a POS system, such as a system for products in a factory.

What is claimed is:

1. An article data processing apparatus comprising:
a first read instructing section which instructs a plurality of first reading apparatuses reading an identification information item in a wireless system to read the identification information items stored in RFID tags attached to articles for sale;
a first receiving section which receives the identification information items read by the plurality of reading apparatuses in response to an instruction of the first read instructing section;
a first storing section which stores the identification information items received by the first receiving section in a predetermined storage region; and
a first duplication data checking section which makes determination about presence or absence of identical identification information items regarding the identification information items stored in the first storing section and when determining that there are identical identification information items, leaves one of the identical identification information items to erase the other identical identification information items.

2. The article data processing apparatus according to claim 1, wherein the first read instructing section instructs the plurality of first reading apparatuses to perform reading in turn.

3. The article data processing apparatus according to claim 1, further comprising an addressing section, wherein, when there is no reply from the first reading apparatus which has been instructed to perform reading by the first read instructing section, the addressing section instructs a first reading apparatus different from the first reading apparatus which has been instructed to perform reading by the first read instructing section to address read the identification information item to the first reading apparatus which has been instructed to perform reading by the first read instructing section, and the different first reading apparatus which has been instructed to perform addressing addresses read the identification information item to the first reading apparatus which has been instructed to perform reading by the first read instructing section based upon the instruction from the addressing section.

4. The article data processing apparatus according to claim 3, wherein the number of the plurality of the first reading apparatuses is at least three, and when there is no reply from the first reading apparatus which has been instructed to perform reading by the read instructing section to the addressing performed by the first reading apparatus different from the first reading apparatus which has been instructed to perform reading by the read instructing section, the addressing section instructs another first reading apparatus to address read the identification information item to the first reading apparatus which has been instructed to perform reading by the first read instructing section, and the other first reading apparatus which has been instructed to perform addressing addresses read the identification information item to the first reading apparatus which has been instructed to perform reading by the first read instructing section based upon the instruction from the addressing section.

5. The article data processing apparatus according to claim 3, wherein, when the first reading apparatus which has been instructed to perform reading by the read instructing section responds to addressing from the first reading apparatus different from the first reading apparatus which has been instructed to perform reading by the read instructing section, the first receiving section receives a read information item transmitted from the first reading apparatus which has been instructed to perform reading by the read instructing section via the first reading apparatus which has been instructed to perform addressing.

6. The article data processing apparatus according to claim 1, further comprising:
    a second read instructing section which instructs a second reading apparatus connected in a wired system and reading an identification information item to read identification information items stored in RFID tags attached to articles for sale;
    a second receiving section which receives the identification information items from the second reading apparatus corresponding to the second read instructing section; and
    a second storing section which stores the identification information items received by the second receiving section in a predetermined storage region.

7. The article data processing apparatus according to claim 6, further comprising a second duplication data checking section which makes determination about presence or absence of identical identification information items regarding the identification information items stored in the first storing section and the second storing section and, when determining that there are identical identification information items, leave one of the identical identification information items to erase the other identical identification information items.

8. The article for sale data processing apparatus according to claim 6, further comprising a third read instructing section which, when one of the first reading apparatuses and the second reading apparatus is transmitting a non-modulated carrier continuously, instructs the other reading apparatus to read the identification information items.

9. An article data processing system comprising:
    a plurality of first reading apparatuses which are put together with articles for sale or a article for sale group attached with RFID tags and which read identification information items stored in the RFID tags attached to the articles for sale or the article for sale group in a wireless system;
    a first read instructing section which instructs the plurality of reading apparatuses to read the identification information items;
    a first receiving section which receives the identification information items from the plurality of the first reading apparatuses corresponding to the first read instructing section;
    a first storing section which stores the identification information items received by the first receiving section in a predetermined storage region; and
    a first duplication data checking section which makes determination about presence or absence of identical identification information items regarding the identification information items stored in the first storing section and when determining that there are identical identification information items, leaves one of the identical identification information items to erase the other identical identification information items.

10. The article data processing system according to claim 9, wherein the first read instructing section instructs the plurality of first reading apparatuses to perform reading in turn.

11. The article data processing system according to claim 9, further comprising an addressing section, wherein, when there is no reply from the first reading apparatus which has been instructed to perform reading by the first read instructing section, the addressing section instructs the first reading apparatus different from the first reading apparatus which has been instructed to perform reading by the first read instructing section to address read the identification information items to the first reading apparatus which has been instructed to perform reading by the first read instructing section, and the different first reading apparatus which has been instructed to perform addressing addresses read the identification information items to the first reading apparatus which has been instructed to perform reading by the first read instructing section based upon the instruction from the addressing section.

12. The article data processing system according to claim 11, wherein the number of the plurality of first reading apparatuses is at least three, and when there is no reply from the first reading apparatus which has been instructed to perform reading by the read instructing apparatus to the addressing performed by the first reading apparatus different from the first reading apparatus which has been instructed to perform reading by the read instructing section, the addressing section instructs another first reading apparatus to address instruct the first reading apparatus which has been instructed to perform reading by the first read instructing section to perform reading.

13. The article data processing system according to claim 9, wherein, when the first reading apparatus which has been instructed to perform reading by the read instructing section responds to addressing from the first reading apparatus different from the first reading apparatus which has been instructed to perform reading by the read instructing section, the first receiving section receives a read information item transmitted from the first reading apparatus which has been instructed to perform reading by the read instructing section via the first reading apparatus which has been instructed to perform addressing.

14. The article data processing system according to claim 9, further comprising:
    a second reading apparatus which is put outside the articles for sale or the article for sale group attached with RFID tags and reads identification information items stored in the RFID tags attached to the articles for sale or the article for sale group;
    a second read instructing section which instructs the second reading apparatus to read the identification information items;
    a second receiving section which receives the identification information items from the second reading apparatus corresponding to the second read instructing section;

a second storing section which stores the identification information items received by the second receiving section in a predetermined storage region; and a second duplication data checking section which makes determination about presence or absence of identical identification information items regarding the identification information items stored in the first storing section and the second storing section and when determining that there are identical identification information items, leaves one of the identical identification information items to erase the other identical identification information items.

15. The article data processing system according to claim 9, further comprising a second duplication data checking section which makes determination about presence or absence of identical identification information items regarding the identification information items stored in the first storing section and the second storing section and, when determines that there are identical identification information items, leaves one of the identical identification information items to erase the other identical identification information items.

16. The article for sale data processing system according to claim 9, further comprising a third read instructing section which, when one of the first reading apparatuses and the second reading apparatus is transmitting a non-modulated carrier continuously, instructs the other reading apparatus to read the identification information item.

17. The article for sale data processing system according to claim 9, wherein
the first reading apparatus comprises
a base substance;
a plurality of reading antennas which are disposed on at least a first surface and a second surface of the base substance, for reading identification information items; and
a communication antenna which is attached to the base substance and transmits the identification information items outside.

18. The article for sale data processing system according to claim 17, wherein the base substance is formed in a plate shape, and the plurality of reading antennas are disposed on surfaces opposed to each other.

19. The article for sale data processing system according to claim 17, wherein the base substance is formed in a box shape, and the plurality of reading antennas are disposed on circumferential surfaces of the base substance and the communication antenna is disposed on an upper surface of the base substance.

* * * * *